(12) United States Patent
Musolf et al.

(10) Patent No.: US 6,875,060 B2
(45) Date of Patent: Apr. 5, 2005

(54) HIGH DENSITY PATCHING SYSTEM

(75) Inventors: Bruce Musolf, Eagan, MN (US); Roger Pautzke, Watertown, MN (US); Jeff Peters, Eagan, MN (US); Thomas Good, Mound, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/278,063

(22) Filed: Oct. 21, 2002

(65) Prior Publication Data

US 2004/0077220 A1 Apr. 22, 2004

(51) Int. Cl.[7] ............................................. H01R 24/04
(52) U.S. Cl. ..................................... 439/668; 439/188
(58) Field of Search ................................ 439/668, 669, 439/188

(56) References Cited

U.S. PATENT DOCUMENTS

| | | | |
|---|---|---|---|
| 4,489,998 A | * 12/1984 | Asick et al. | 439/62 |
| 4,514,030 A | 4/1985 | Triner et al. | |
| 4,519,665 A | * 5/1985 | Althouse et al. | 439/608 |
| 4,815,104 A | 3/1989 | Williams et al. | |
| 4,840,568 A | 6/1989 | Burroughs et al. | |
| 5,199,878 A | 4/1993 | Dewey et al. | |
| 5,233,501 A | 8/1993 | Allen et al. | |
| 5,393,249 A | 2/1995 | Morgenstern et al. | |
| 5,552,962 A | 9/1996 | Feustel et al. | |
| 5,582,525 A | 12/1996 | Louwagie et al. | |
| 5,685,741 A | 11/1997 | Dewey et al. | |
| 5,879,197 A | 3/1999 | Dewey | |
| 6,116,961 A | 9/2000 | Henneberger et al. | |
| 6,186,798 B1 | 2/2001 | Follingstad et al. | |
| 6,431,884 B1 | * 8/2002 | Wallace et al. | 439/86 |
| 6,503,105 B1 | * 1/2003 | Johnsen | 439/668 |
| 6,632,106 B2 | * 10/2003 | Musolf et al. | 439/668 |
| 2002/0173188 A1 | * 11/2002 | Follingstad et al. | 439/188 |
| 2003/0064611 A1 | * 4/2003 | Musolf et al. | 439/43 |

FOREIGN PATENT DOCUMENTS

| | | |
|---|---|---|
| JP | 7-211375 | 8/1995 |
| WO | WO 96/37929 | 11/1996 |
| WO | WO 00/60704 | 10/2000 |
| WO | WO 02/082585 A2 | 10/2002 |

OTHER PUBLICATIONS

ADC Telecommunications Inc., *Broadcast and Entertainment Products Catalog*, 8th Edition, pp. 1–55 (May, 2000).
Bittree Incorporated, *High Performance Patching Systems Catalog*, pp. 1–14 (c 2000).
Bittree Incorporated, *High Performance Patching Systems Catalog*, pp. 1–14 (c 1999).
Photos of a product manufactured by Switchcraft, Inc., 10 pages; publicly disclosed Apr. 23, 2001.

* cited by examiner

*Primary Examiner*—Hae Moon Hyeon
(74) *Attorney, Agent, or Firm*—Merchant & Gould P.C.

(57) ABSTRACT

A patching system is disclosed herein. The patching system includes a plurality of patching jacks. The jacks include switches for changing the circuit configurations of the patching circuitry of the jacks. The switches are positioned to enhance the circuit density of the patching system.

13 Claims, 16 Drawing Sheets

HIGH DENSITY PATCHING SYSTEM

FIELD OF THE INVENTION

The present invention relates to patching systems for audio and video applications.

BACKGROUND

Analog and digital audio signals are transmitted over balanced and shielded twisted pair cables. These cables include a pair of insulated conductors, either stranded or solid wire, which are surrounded by a metal foil shield. The shield serves to reduce the impact of external electromagnetic inference on the signal being transmitted over the cable and also to reduce the electromagnetic field generated by the signals being transmitted over the cable.

In a professional audio and video industry application, a large number of such cables will be in use to carry signals from sources to processing devices such as mixers or equalizers and further to amplifiers or other downstream devices. The environment in which these signals are generated is quite dynamic and requires the ability to quickly and easily shift connections between sources, and downstream devices. A jack field provides this sort of connection flexibility. A jack field allows incoming signals to be patched into circuits connected to devices and signals returning from devices to be patched into circuits connected to downstream devices. Each jack in this jack field requires three conducting paths, two for the balanced audio signal and one for the shield to serve as a grounding path. There are three principal ways to connect these jacks to one another, depending on the needs of the particular situation.

First, a jack field may be set up for non-normal connections, meaning that each jack is connected directly to another jack. When a connection between devices is needed, a patch cord must be used. For example, a source is connected to J1 and J1 is electronically linked to jack 1. A device is connected to J2 and J2 is electronically linked to jack 2. To link the source to the device, a patch cord would be used to electronically link jack 1 to jack 2, as shown in FIG. 1b. Without a patch cord in place in jack 1 or jack 2, no connection will exist for either the source or the device, as shown in FIG. 1a.

A second method of connecting jacks is referred to as normal. As an example, a source and an device are designated to be linked together electronically as a default or normal condition, but it is still necessary to be able to switch the source to another device, or connect another source to the device, on occasion. To accomplish this, a source is connected to J1 and an device is connected to J2. J1 is also electronically connected to J2. Jacks 1 and 2 are placed in the circuit connecting J1 and J2, as shown in FIG. 2a, and are configured such that, if a patch cord is inserted into jack 1 or jack 2, the connection between J1 and J2 is broken, as shown in FIG. 2b. If a patch cord is inserted into jack 1, it will not only break the J1–J2 connection, but the patch cord will be electronically linked to the source connected to J1. Similarly, a patch cord inserted into jack 2 will break the J1–J2 connection and be electronically linked with the device connected to J2. So, in a normal configured jack field, two elements can be configured to be normally electronically connected to one another but that normal connection can be broken and the connections redirected as necessary.

A third method of connecting jacks is referred to as half-normal. In the default state, a source connected to J1 and an device connected to J2 are connected together through jack 1 and jack 2, as shown in FIG. 3a. This arrangement allows, for example, the feed coming from a source to J1 to be monitored by a device connected into the normal circuit by a patch cord inserted into jack 1 without the insertion of the patch cord into jack 2 causing the connection between the source and the device connected to J2 to be broken, as shown in FIG. 3b. In addition, the connection between the source and the device can be broken by the insertion of a patch cord in jack 2. When a patch cord is inserted into jack 2, the patch cord in jack 1 can then be used to patch the source to another device and patch cord in jack 2 can be used to patch another source to the device, as shown in FIG. 3c.

Another aspect of the connection between jacks and devices connected to the jacks is the treatment of the shield. Typically, the shield of the cable connected to the first jack is electronically linked to the shield of the cable connected to the second jack when the first jack and the second jack are electronically linked. It is desirable to have the ability to link the shields either individually or jointly to a common ground. This allows maximum flexibility in the configuration in the electronic linkages between the jacks, depending on the devices connected to the jacks.

While these connection schemes within a jack field are known, the ability of users to reconfigure a jack field or a jack pair within a jack field from one to another of the three arrangements could be improved. A variety of approaches have been used in the past, including wire wrapping leads together between the jacks, soldering the leads together between the jacks, using straps or jumpers to reconfigure connections between jacks, or using small metal plates of different sizes and shapes to reconfigure the connection between jacks. In some designs, the entire jack field would need to be exchanged to reconfigure the arrangement. This type of design does not allow the users to configure the circuits connected to individual devices and required all devices connected to a particular jack field to be configured identically. Improvement to the ability to create and modify the state of the connection between jacks and individual devices in the jack fields is desirable.

In addition, users of these types of devices and jack fields have very complex and dense wiring environments within their physical plants. Improvement to the density of connections possible in the limited space available within their physical plant without a loss of flexibility of configuration is desirable.

SUMMARY

One inventive aspect of the present disclosure relates to a high density patching system. The patching system includes a plurality of jacks patching circuitry for providing patching functions. The jacks also include integral switching devices for changing the circuit configurations of the patching circuitry. For example, in one embodiment, the switching devices are adapted for changing the patching circuitry between a normal-out configuration, a half-normal configuration, a normal-strapped configuration and a sleeve-normal configuration. In one embodiment, the circuit density of the system is enhanced by positioning the switching devices directly behind the patching circuitry.

A variety of other inventive aspects of the disclosure are set forth in part in the description that follows, and in part will be apparent from the description, or may be learned by practicing the inventive aspects. The inventive aspects relate to individual features as well as combinations of features. It is to be understood that both the foregoing general descrip-

Figure 1A:
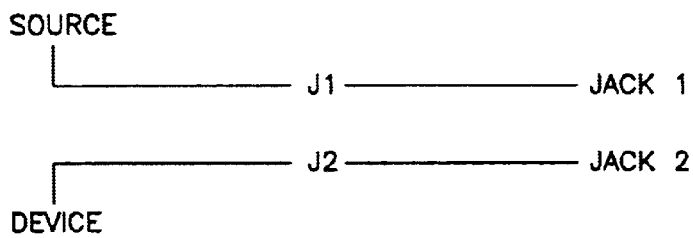
FIG. 1a schematically illustrates two prior art jacks having normal-out circuit configurations.
Figure 1B:
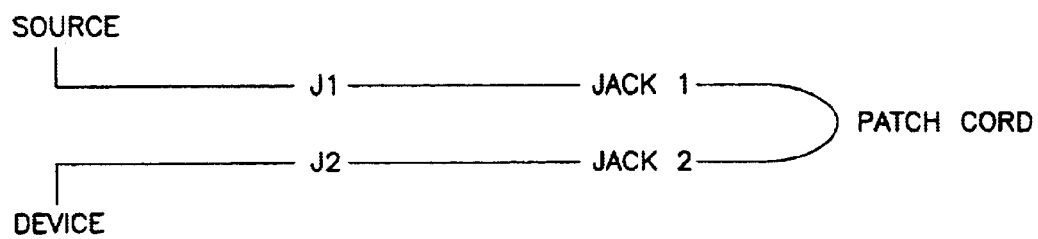
FIG. 1b illustrates the prior art jacks of FIG. 1a patched together with a patch cord.
Figure 2A:
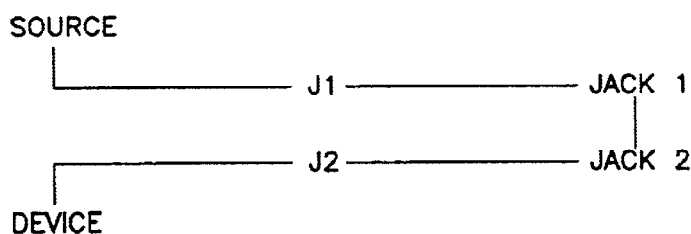
FIG. 2a illustrates two prior art jacks having a normal-strapped circuit configuration.
Figure 2B:
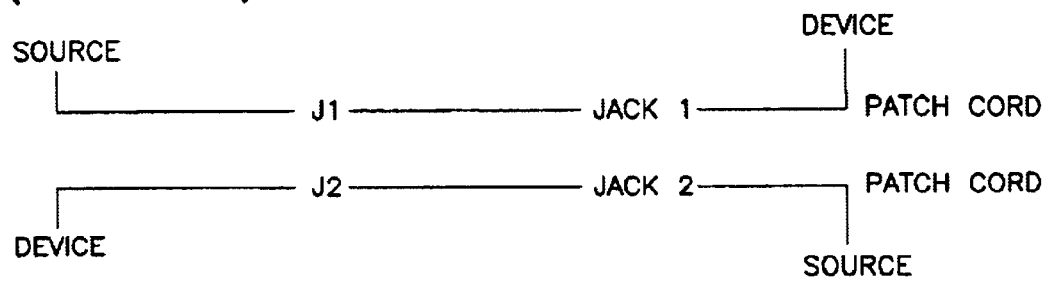
FIG. 2b illustrate the jacks of FIG. 2a with jack 1 patched to a device and with jack 2 patched to a source.
Figure 3A:
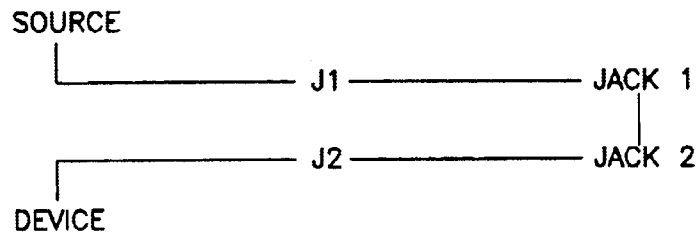
FIG. 3a illustrates two jacks having a half-normal circuit configuration.
Figure 3B:
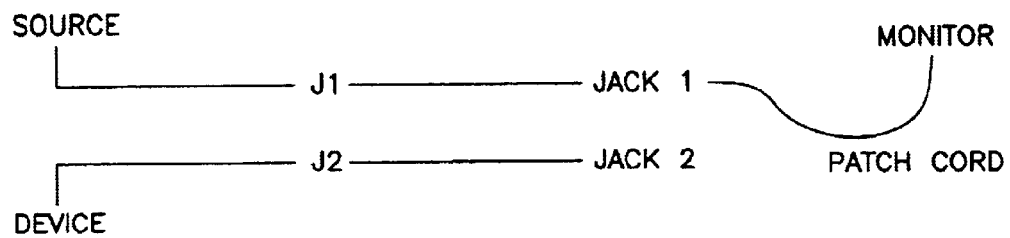
FIG. 3b illustrates the jacks of FIG. 3a with a patch cord inserted within jack 1 to provide a monitor function.
Figure 3C:
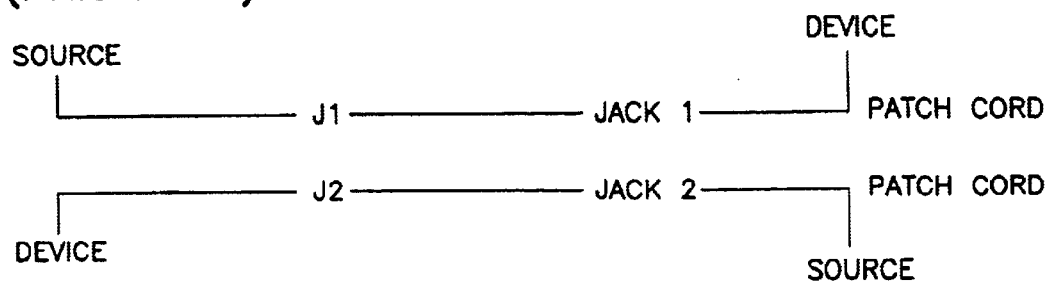
FIG. 3c illustrates the jacks of FIG. 3a with jack 1 patched to a device and with jack 2 patched to a source.

While the embodiments disclosed herein are amenable to various modifications and alternative forms, specifics thereof have been shown by way of example in the drawings and will be described in detail below. It is to be understood, however, that the intention is not to limit the inventive aspects of the present disclosure to the particular embodiments described. On the contrary, the disclosed embodiments are merely examples of how certain inventive aspects may be practiced, and that other embodiments are not excluded.

DETAILED DESCRIPTION

In the following detailed description, references are made to the accompanying drawings that depict various embodiments in which the inventive aspects may be practiced. It is to be understood that other embodiments may be utilized, and structural and functional changes may be made without departing from the scope of the inventive aspects.

Figure 4:
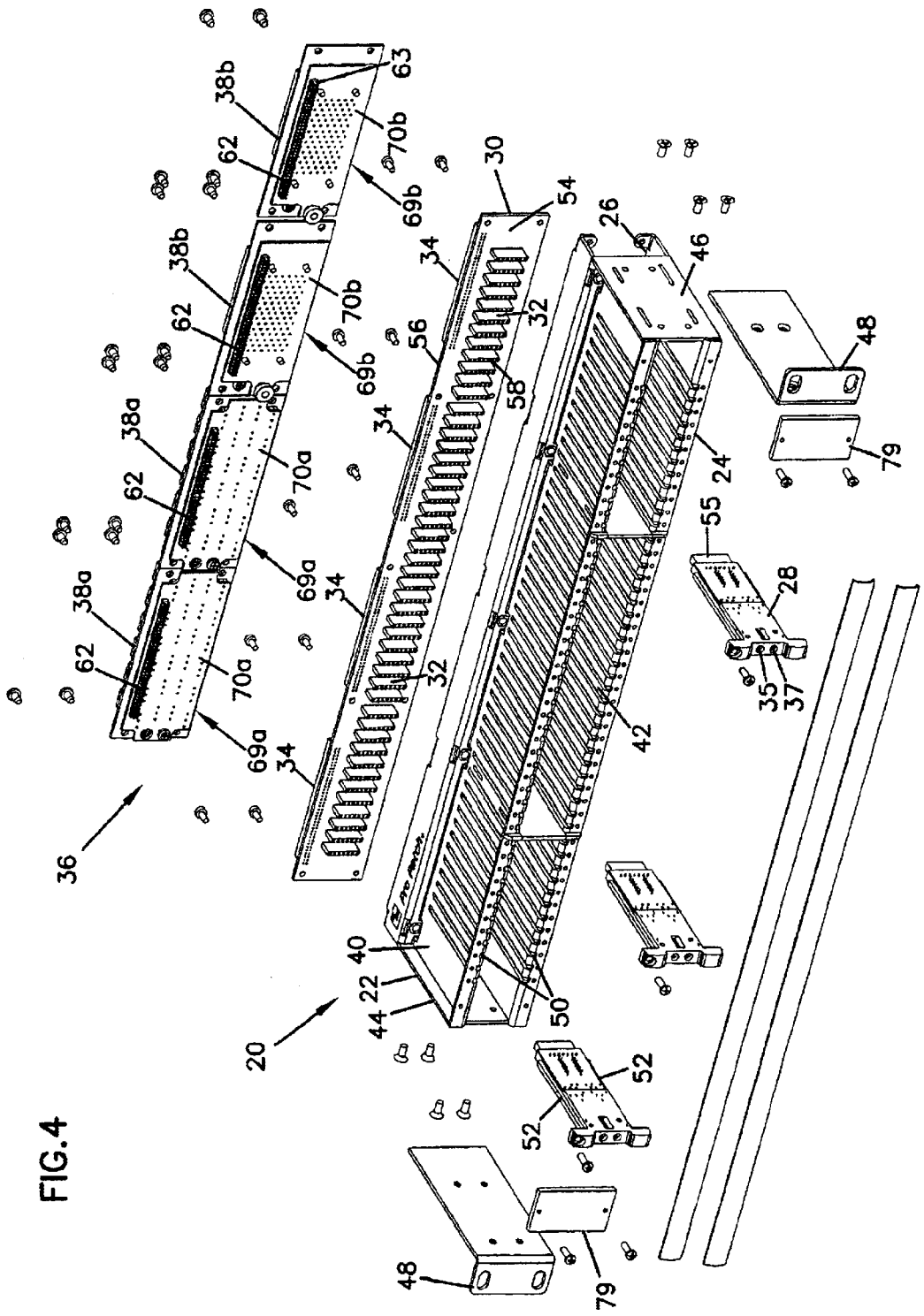
FIG. 4 is an exploded, front perspective view of a patching system having inventive aspects in accordance with the principles of the present disclosure.

FIG. 4 illustrates a patching system 20 having features that are examples of inventive aspects in accordance with the principles of the present disclosure. The patching system 20 includes a chassis 22 having a front side 24 and a rear side 26. The patching system 20 also includes jacks 28 that insert into the chassis 22 through the front side 24 of the chassis 22, and a rear connector assembly 36 accessible from the rear side 26 of the chassis 22. The jacks 28 provide patch plug access (e.g., via upper and lower ports 35, 37), and the rear connector assembly 36 includes connectors 38a, 38b adapted for connection to equipment such as audio and data streaming equipment. The patching system 20 further includes a back-plane board 30 that mounts to the rear of the chassis 22 and provides an electrical interface between the rear connector assembly 36 and the jacks 28.

A. Chassis

Figure 5:
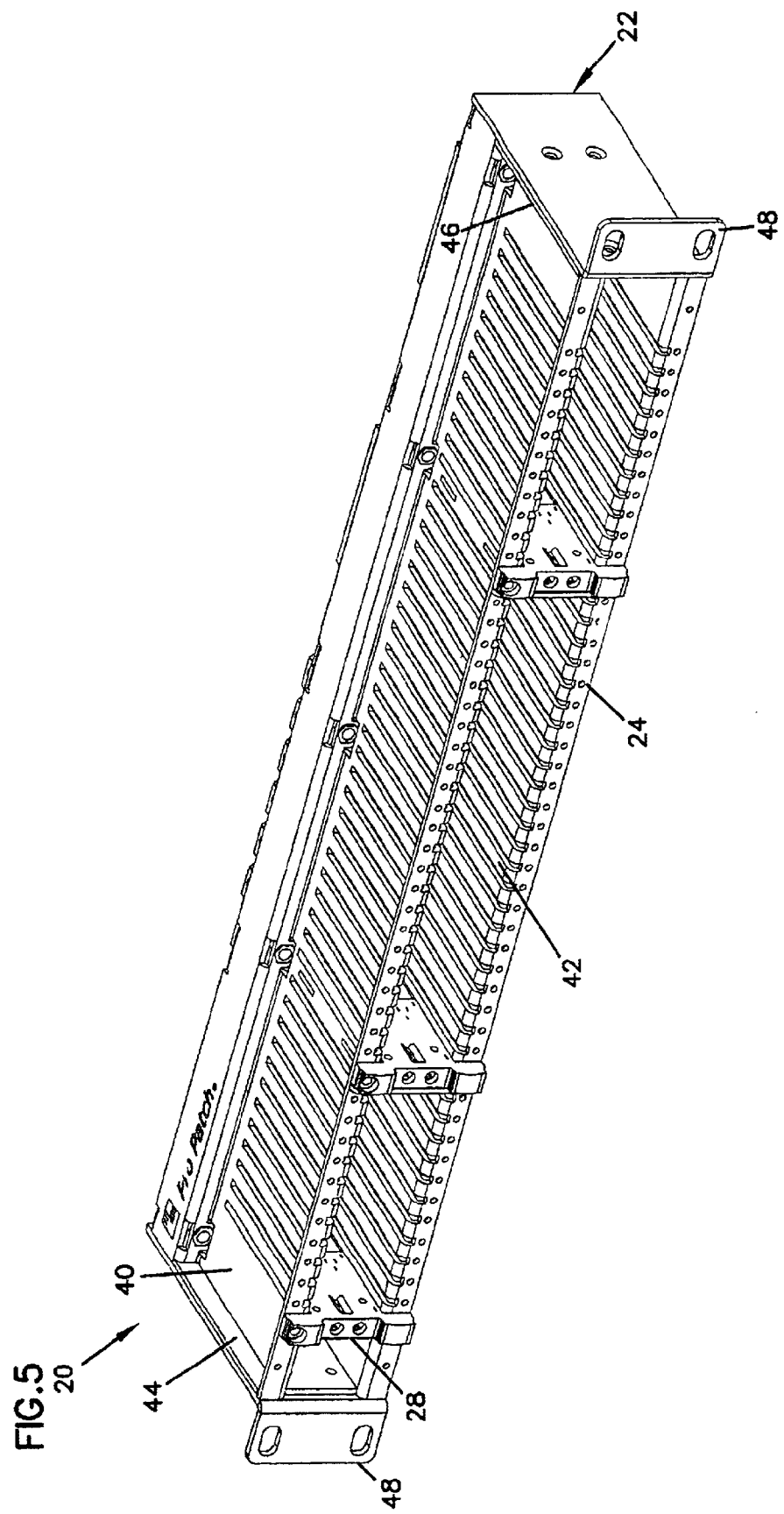
FIG. 5 is an assembled, front perspective view of the patching system of FIG. 4.
Figure 6:
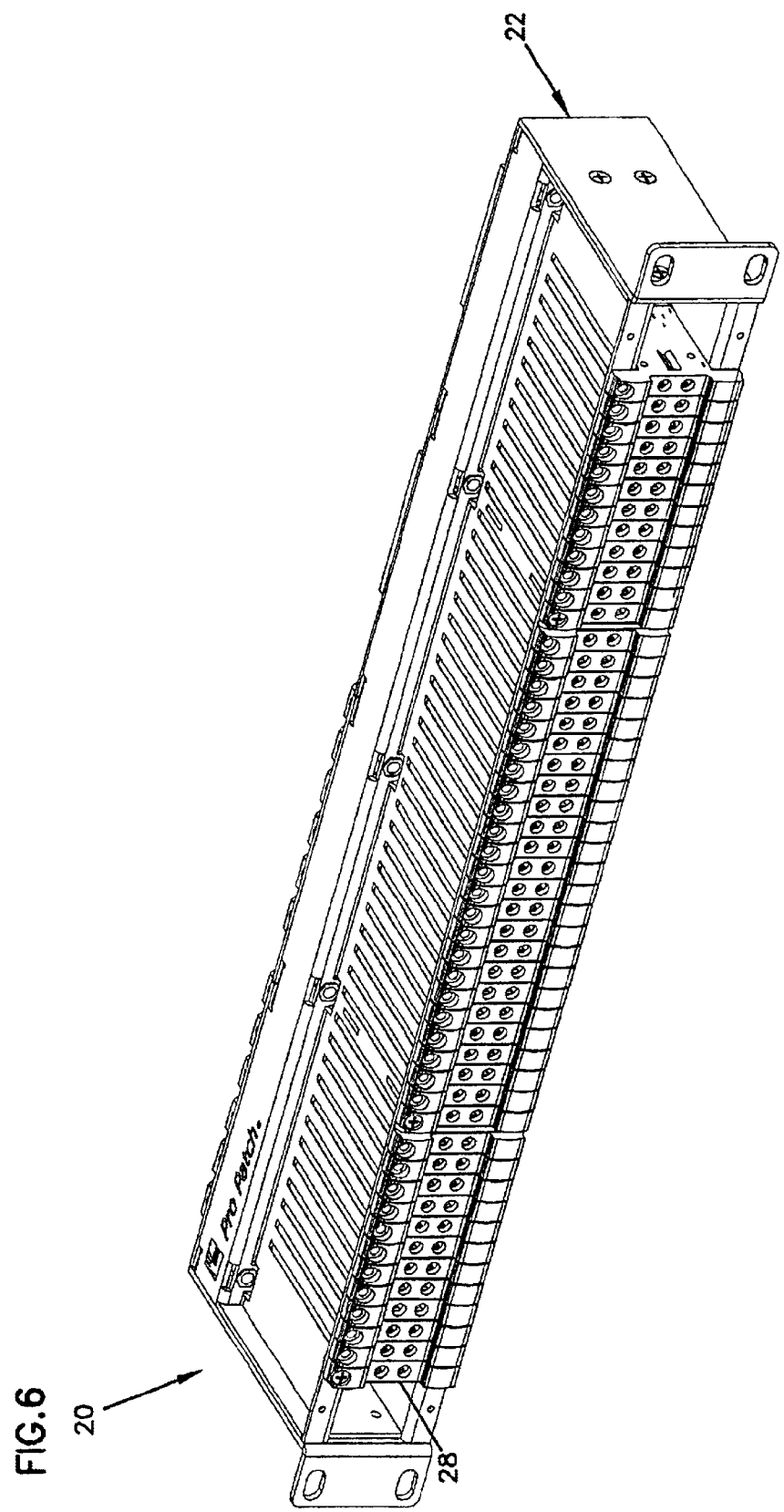
FIG. 6 shows the patching system of FIG. 5 with the chassis fully loaded with jacks.

Referring to FIGS. 4–6, the chassis 22 has a generally rectangular configuration and includes a top wall 40, a bottom wall 42, a left wall 44 and a right wall 46. As shown in FIG. 4, the front and rear sides 24, 26 of the chassis 22 are open. Flanges 48 are mounted to the left and right walls 44, 46. The flanges 48 facilitate securing the chassis 22 to a conventional rack or frame. The chassis 22 preferably also includes structure for facilitating receipt/insertion of the jacks 28. For example, the top and bottom walls 40, 42 of the chassis 22 are shown including opposing guide slots 50 for receiving top and bottom guides 52 of the jacks 28. The guide slots 50 ensure the jacks 28 are inserted into the chassis at the proper orientation and location. Cover panels 79 can be mounted to the front of the chassis 22 adjacent the left and right walls 44, 46. The panels 79 provide vertical, forwardly facing surfaces for vertical designation labels.

B. Back-plane Board

As shown in FIG. 4, the back-plane board 30 is aligned perpendicular relative to a direction of insertion of the jacks 28, and includes a front side 54 positioned and a rear side 56. Jack interface connectors 32 are mounted in a horizontal row across the front side 54 of the back-plane board 30. The jack interface connectors 32 are adapted to mate with corresponding rear connectors 55 of the jacks 28. The jack interface connectors 32 are elongated in a vertical direction and include a vertical row of sockets 58 adapted for receiving conductive pins 600–606 (see FIG. 14) of the rear connectors 55 of the jacks 28. When the back-plane board 30 is mounted at the rear side 26 of the chassis 22, the jack interface connectors 32 preferably project into the interior of the chassis and align with the sets of guide slots 50 of the chassis 22. The alignment between the guide slots 50 and the jack interface connectors 32 ensures that when a jack 28 is inserted within a set of the guide slots 50, the rear connector 55 of the jack 28 will mate with a corresponding jack interface connector 32 of the back-plane board 30.

Referring still to FIG. 4, rear module interface connectors 34 are mounted at the back side 56 of the back-plane board 30. The rear module interface connectors 34 are adapted to mate with corresponding rear module connectors 62 of the rear connector assembly 36. For example, the rear module interface connectors 34 can include two rows of sockets (not shown) adapted to receive corresponding conductive pins 63 of the rear module connectors 62. The jack interface connectors 32 are electrically connected to the rear module interface connectors 34 by tracings provided on the back-plane board 30.

C. Rear Connector Assembly

Figure 7:
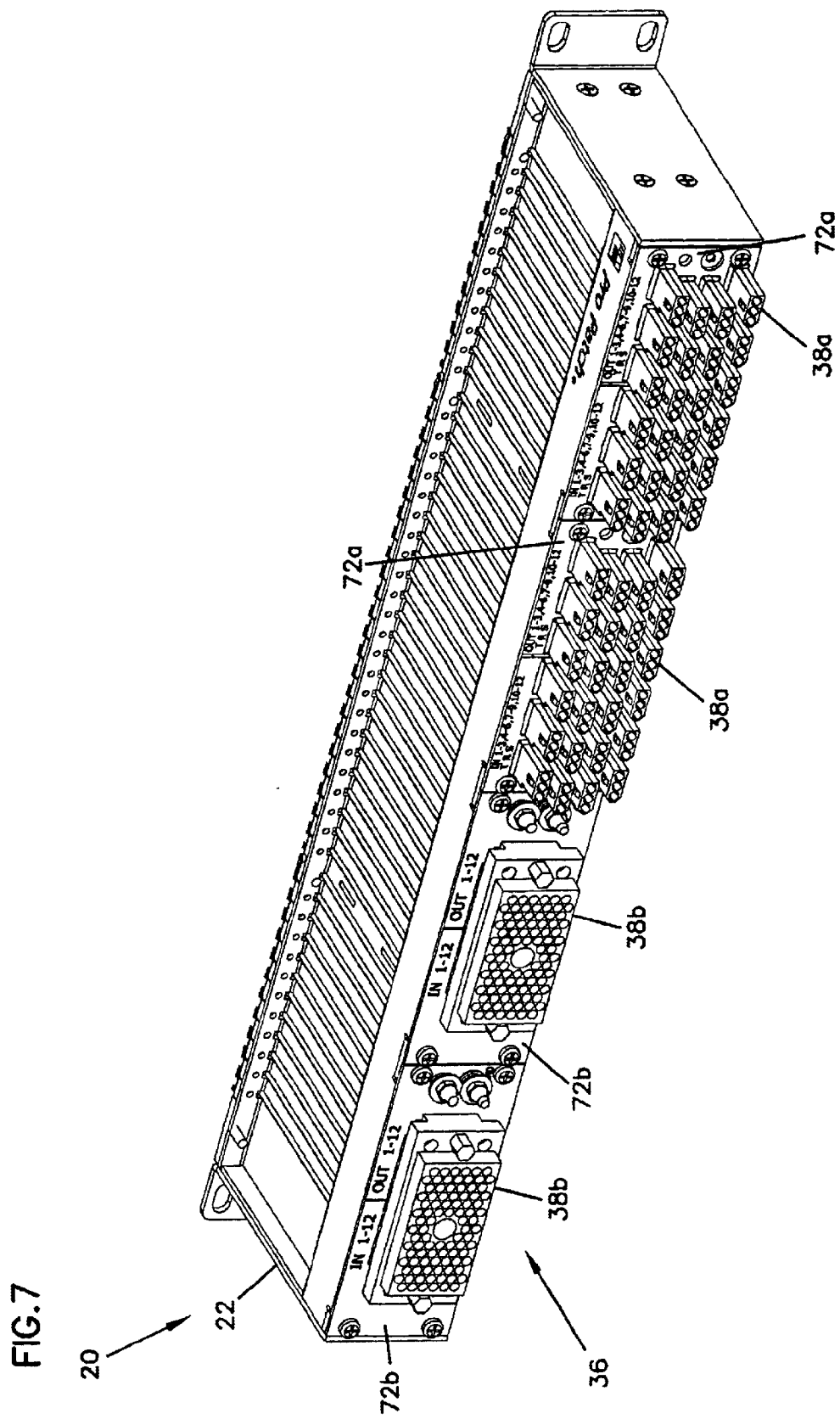
FIG. 7 is a rear, perspective view of the patching system of FIG. 6.
Figure 8:
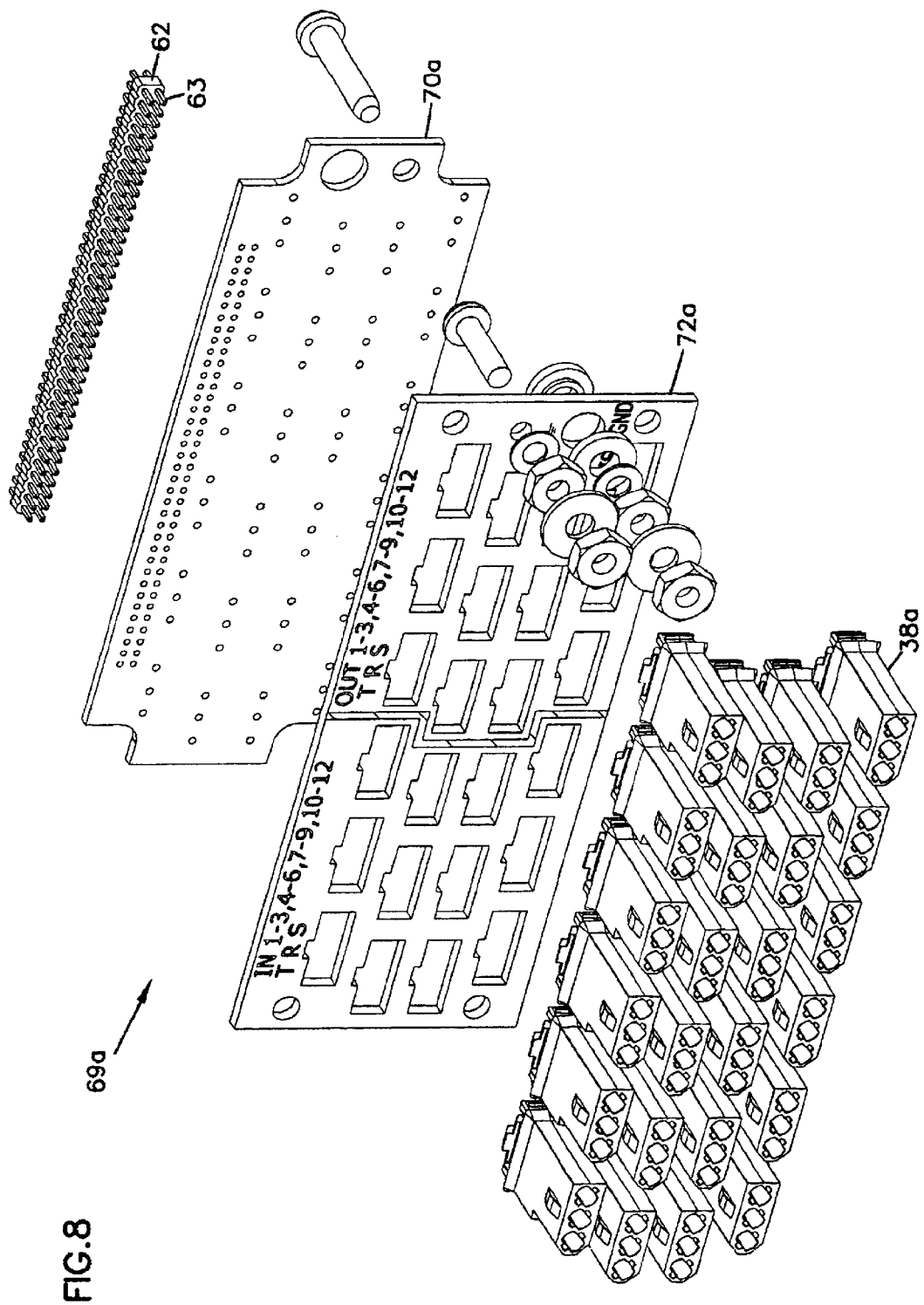
FIG. 8 is an exploded view of a rear interface assembly of the patching system of FIGS. 4–7.
Figure 9:
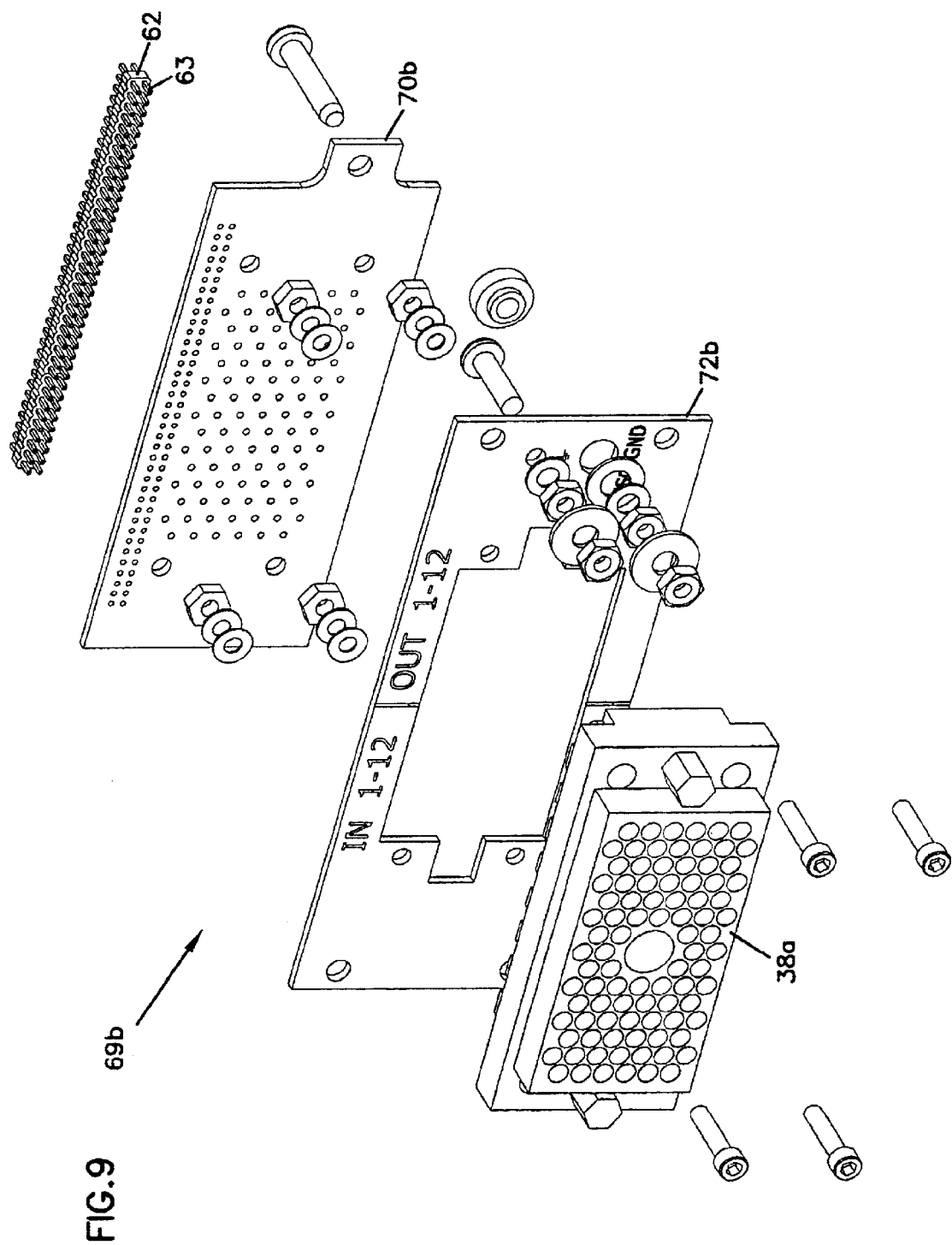
FIG. 9 is an exploded view of another rear interface assembly of the patching system of FIGS. 4–7.

Referring again to FIG. 4, the rear connector assembly 36 includes two pairs of rear modules 69a, 69b. The modules 69a, 69b each include a separate circuit board 70a, 70b. The rear module connectors 62 are mounted to front sides of the circuit boards 70a, 70b. As shown in FIGS. 7–9, protective panels 72a, 72b cover back sides of the circuit boards 70a, 70b. The rear connectors 38a, 38b are electrically connected to the back sides of their respective circuit boards 70a, 70b and project through openings defined by the protective panels 72a, 72b. As best show in FIG. 8, the rear connectors 38a are depicted as rack and panel 3 pin connectors. As best show in FIG. 9, the connectors 38b are depicted as rack and panel 90 pin connectors. The rear connectors 38a, 38b are electrically connected to corresponding pins 63 of the connectors 62 by tracings provided on the circuit boards 70a, 70b. It will be appreciated that other connectors types could also be used. Further, it will be appreciated that the modularity of the rear interface assembly 36 facilitates use of different types of connectors thereby providing greater design flexibility. However, in alternative embodiments, the multiple circuit boards 70a, 70b could be replaced with a single circuit board.

D. Jack

Figure 10:
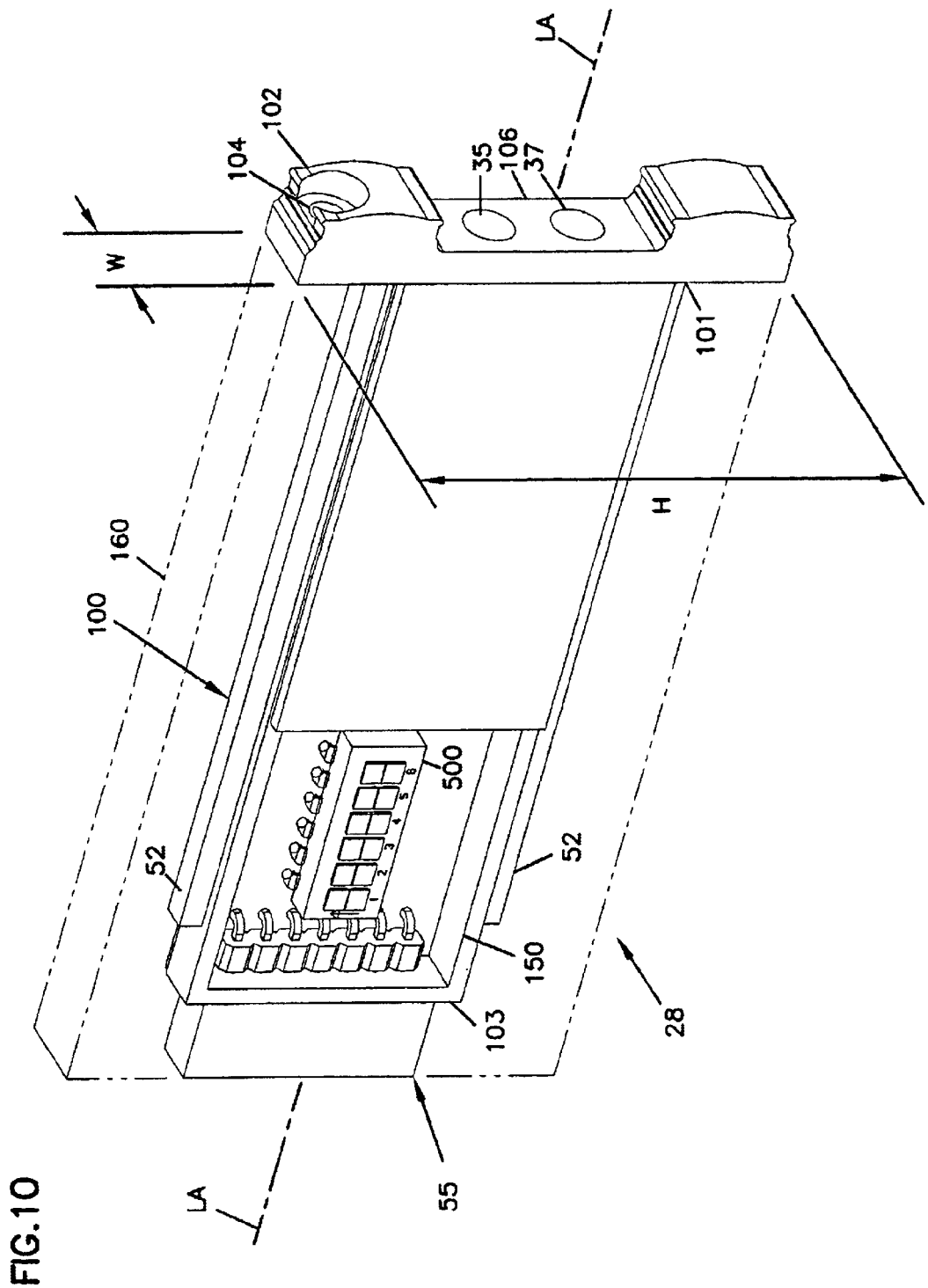
FIG. 10 is a front perspective view of one of the jacks of the patching system of FIGS. 4–7.
Figure 11:
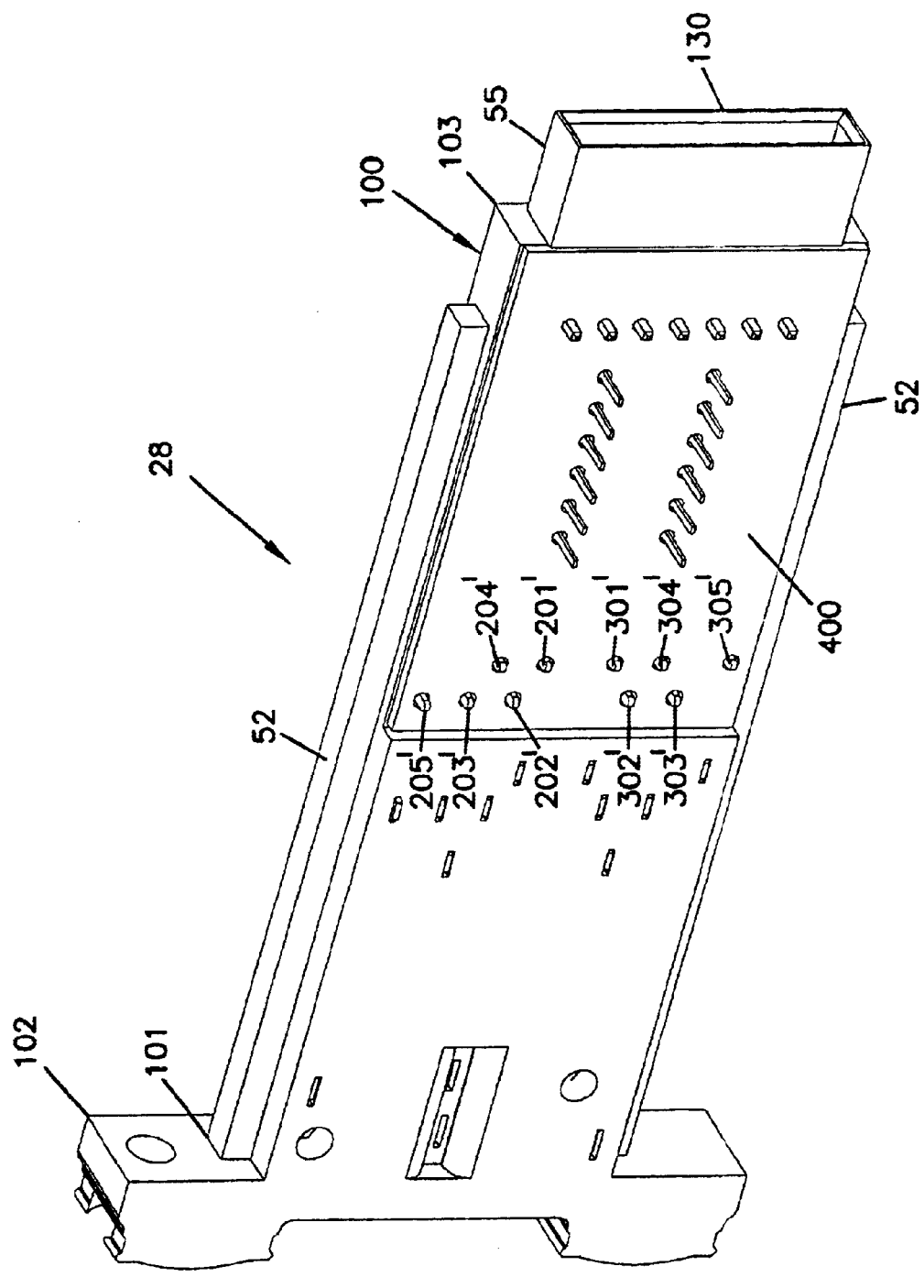
FIG. 11 is a rear perspective of the jack of FIG. 10.

FIGS. 10 and 11 illustrate one of the patching jacks 28 in isolation from the patching system 20. The jack 28 includes a dielectric body 100 having a front end 101 and a back end 103. A mounting panel 102 is located at the front end 101, and the jack connector 55 is located at the back end 103. The dielectric body 100 also defines the top and bottom guides 52 of the jack 28.

The mounting panel 102 of the dielectric body defines a fastener opening 104 for receiving a fastener for attaching the jack 28 to the chassis 22. The mounting panel 102 also includes an intermediate region 106 in which a single pair of patching ports 35, 37 are defined. As labeled in FIG. 10, the front panel 102 defines a height H and a width W of the jack 28. Preferably, the width W is less than 0.35 inches and the height H is less than 2 inches.

The dielectric body 100 is adapted for holding/supporting a plurality of contact springs. For example, referring to FIG. 12, the dielectric body 100 defines upper and lower spring mounting regions 107, 108 separated by a divider 105. Upper and lower spring assemblies 200, 300 are respectively mounted at the upper and lower spring mounting regions 107, 108. Each of the first and second spring assemblies 200, 300 respectively includes a tip spring 201, 301, a normal spring 202, 302 corresponding to the tip spring 201, 301, a ring spring 203, 303 and a normal spring 204, 304 corresponding to the ring spring 203, 303. The spring assemblies 200, 300 also each respectively include sleeve ground springs 205, 305.

The first spring assembly 200 corresponds to the upper patching port 35 and the second spring assembly 300 corresponds to the lower patching port 37. The tip and ring springs 201, 203 are positioned such that when a tip and ring plug is inserted within the upper patching port 35, the springs 201, 203 are disconnected from their corresponding normal contacts 202, 204 and connected to the plug. Concurrently, the sleeve ground spring 205 contacts the sleeve ground of the plug inserted within the port 35. It will be appreciated that the second spring assembly 300 operates in a similar manner. For example, when a patch plug is inserted within the lower patching port 301, the tip and ring springs 301, 303 are disconnected from their corresponding normal springs 302, 304 and connected to the plug. Concurrently, the sleeve ground 305 is electrically connected to the sleeve of the plug.

Figure 12:
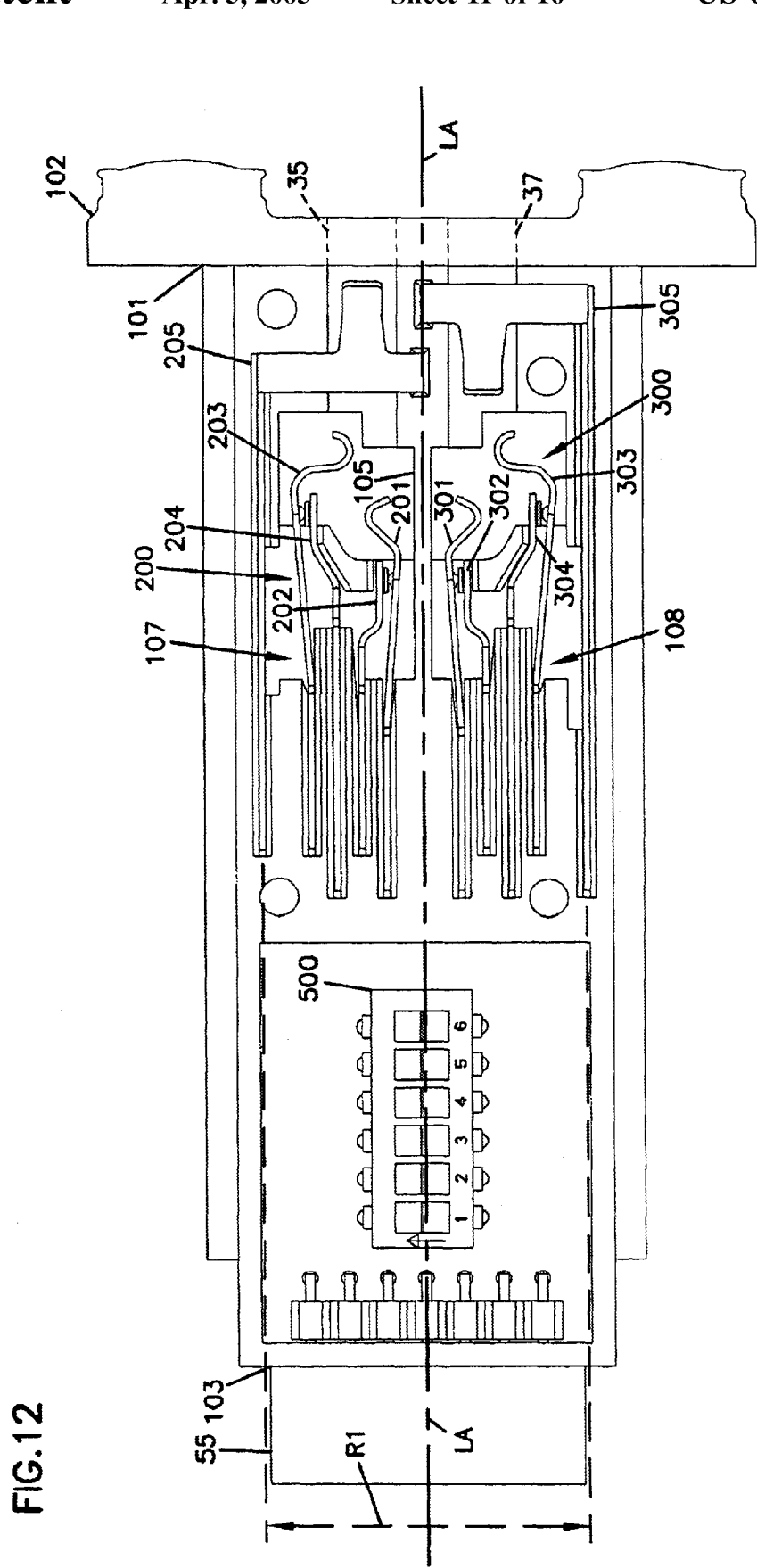
FIG. 12 is a side view of the jack of FIGS. 10 and 11 with a side panel removed to expose internal contact springs.

The springs 201–205 and 301–305 can be secured to the jack body 100 by any number of known techniques. As shown in FIG. 12, the springs 201–205 and 301–305 are press fit within slots defined by the jack body 100. As shown in FIG. 11, the springs 201–205 and 301–305 have post ends 201'–205' and 301'–305' terminated to a circuit board 400. The circuit board 400 provides electrical connections between the springs 201–205 and 301–305 and the conductive pins 600–606 of the rear connector 55. For example, as shown schematically in FIGS. 16–19, the circuit board 400 electrically connects tip spring 201 to pin 600, ring spring 203 to pin 601, sleeve ground spring 205 to pin 602, tip spring 301 to pin 603, ring spring 303 to pin 604 and sleeve ground spring 305 to sleeve ground pin 605.

As described in more detail later in the specification, the circuit board 400 also electrically connects to pins 600–606 and the springs 201–205 and 301–305 to a switching device 500 for changing the circuit configuration of the jack 28 between a normal-out configuration (see FIG. 16), a half-normal configuration (see FIG. 17) and a normal-strapped configuration (see FIG. 18). The switching device 500 also allows the jack 28 to be switched to a sleeve-normal position (see FIG. 19). As shown in FIG. 10, the dielectric body 100 defines a window 150 for allowing the switching device 500 to be accessed from the left side of the jack 28. The window 150 allows a user to change the circuit configuration of the jack 28.

Figure 14:
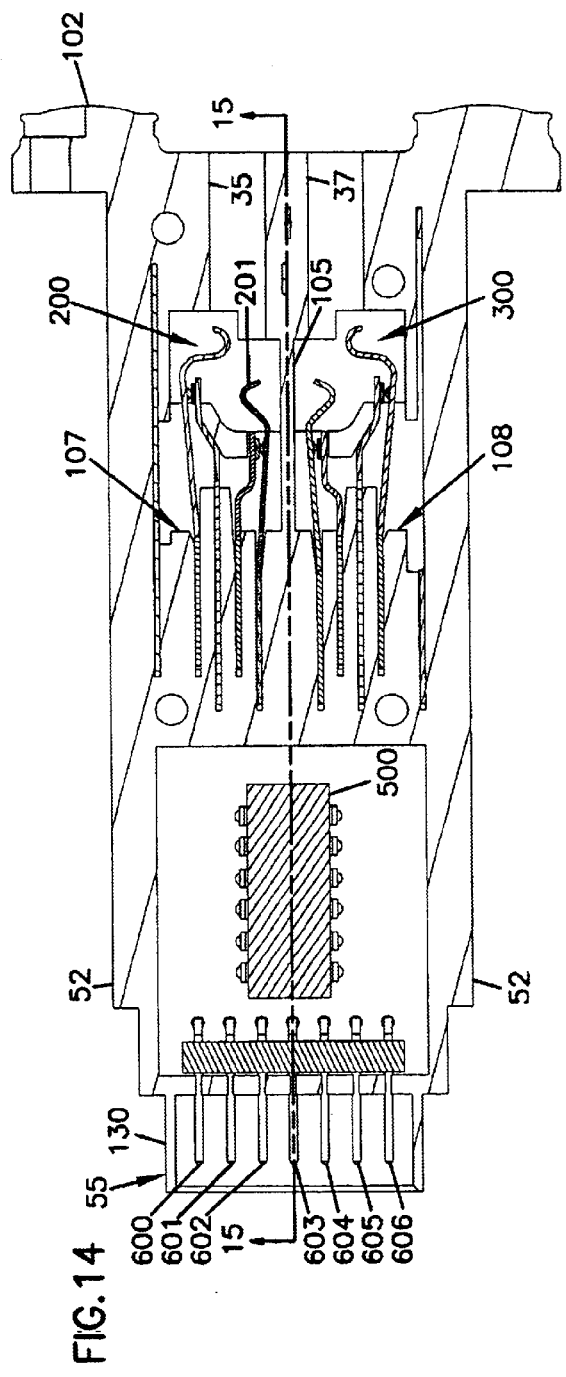
FIG. 14 is a cross-sectional view taken along section line 14—14 of FIG. 13.
Figure 15:
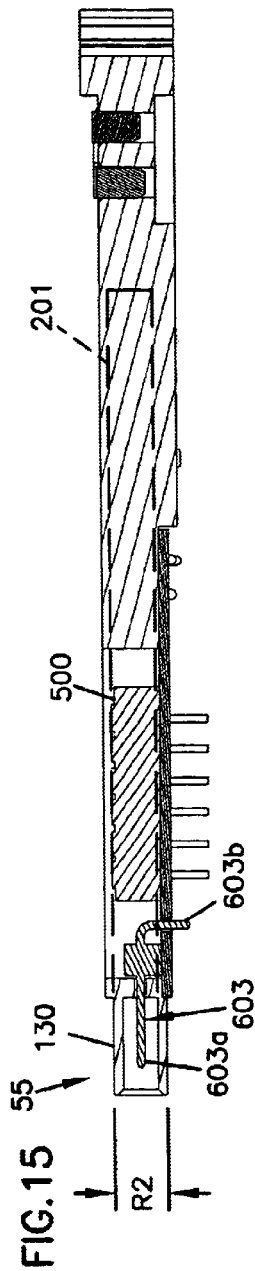
FIG. 15 is a cross-sectional view taken along section line 14—14 of FIG. 14.

Referring now to FIGS. 14 and 15, the rear connector 55 of the jack 28 includes a single row header having a single row of conductive pins (i.e., pins 600–606) housed within a dielectric shroud 130. The conductive pins include first portions that project into the shroud 130 (see portion 603a of pin 603 in FIG. 15), and second portions (see portion 603b of pin 603 in FIG. 15) that terminate at the circuit board 400. The first portions are connected to the second-portions by a curved portion (e.g., a 90-degree bend portion).

It is preferred for all of the components of the dielectric jack body 100 to be integrally molded or formed as a single unitary piece. For example, it is preferred for the front panel 102, the rear shroud 130, the spring mounting regions 107, 108, the divider 105 and the guides 52 to be molded as a single unitary piece of dielectric material (e.g., plastic).

Referring to FIG. 12, the switching device 500 is depicted as a DIP switch having 6 two-position switches. It will be appreciated that other types of switches (e.g., dial switches, rotary switches, multi-position switches, etc.) can also be used. A jack device having a switching device is also disclosed in U.S. application Ser. No. 09/828,706, filed Apr. 6, 2001, which is hereby incorporated by reference in its entirety.

E. Spacial Relationships of the Jack Component

As shown in FIGS. 12, 14 and 15, the switching device 500 is located directly behind the upper and lower spring assemblies 200, 300. The term "directly behind", means that at least a portion of the switching device 500 is located behind the first and second spring assemblies 200, 300 in the region R1 (see FIG. 12) defined between the uppermost spring of the upper spring assembly 200 (namely spring 205 in the depicted embodiment) and the lowermost spring of the lower spring assembly 300 (namely spring 305 in the depicted embodiment). At least a portion of the switching device 500 is also located in the region R2 (see FIG. 15) defined by the widths of the springs 201–205 and 301–305.

Referring back to FIG. 10, at least a portion of the switching device 500 is also located within the outer boundary defined by the height H and width W of the front panel 102. To demonstrate this point, the height and width H and W of the front panel 102 have been projected rearwardly by dashed lines 160. In this view, it is clear that the switching device 500 is located within the boundary defined by the dashed lines 160.

Figure 13:
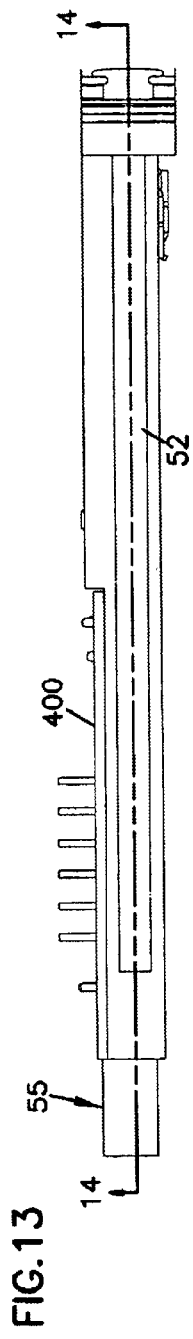
FIG. 13 is a top view of the jack of FIGS. 10 and 11.

Referring to FIG. 12, the switching device 500 is elongated in a horizontal direction and is aligned along a central longitudinal axis LA of the jack 28. The axis LA extends between the spring assemblies 200, 300 and also between the ports 35, 37. The switching device 500 is located physically between the spring assemblies 200, 300 and the rear connector 55. As shown in FIG. 13, the circuit board 400 is offset from a vertical plane (aligned along cross-section line 14—14) that bisects the ports 35, 37. As shown in FIG. 14, the vertical plane cuts through the springs 201–205 and 301–305 as well as the switching device 500.

F. Circuit Configurations

Figure 16:
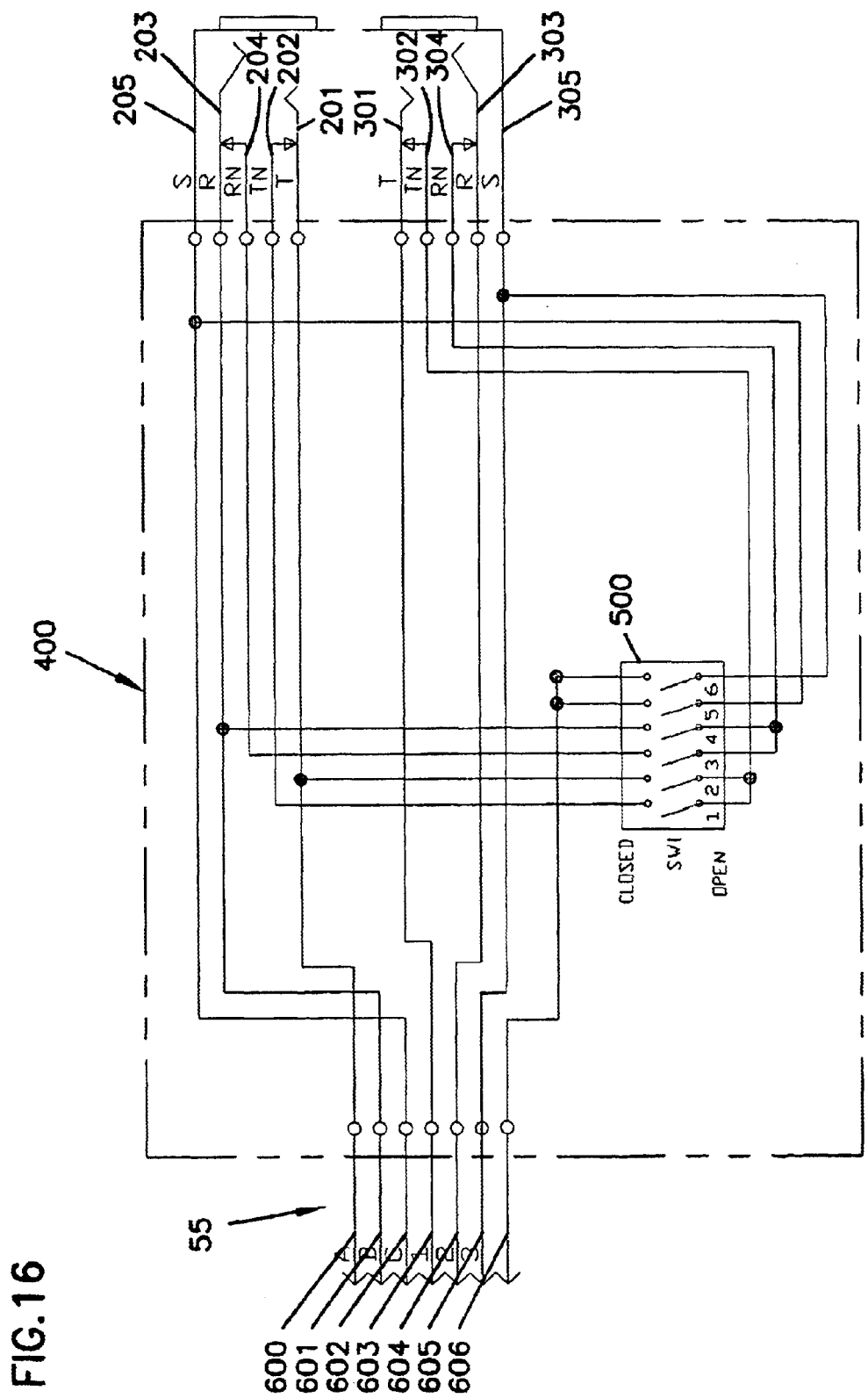
FIG. 16 is a schematic depiction of the jack of FIGS. 10 and 11 in a normal-out circuit configuration.

FIG. 16 shows the jack 28 in a normal-out configuration. In this configuration, all of the switches of the switching assembly 500 are open such that no electric connection is provided between the two switching assemblies 200, 300. Thus, in this configuration, the jack 28 merely provides patching capabilities.

Figure 17:
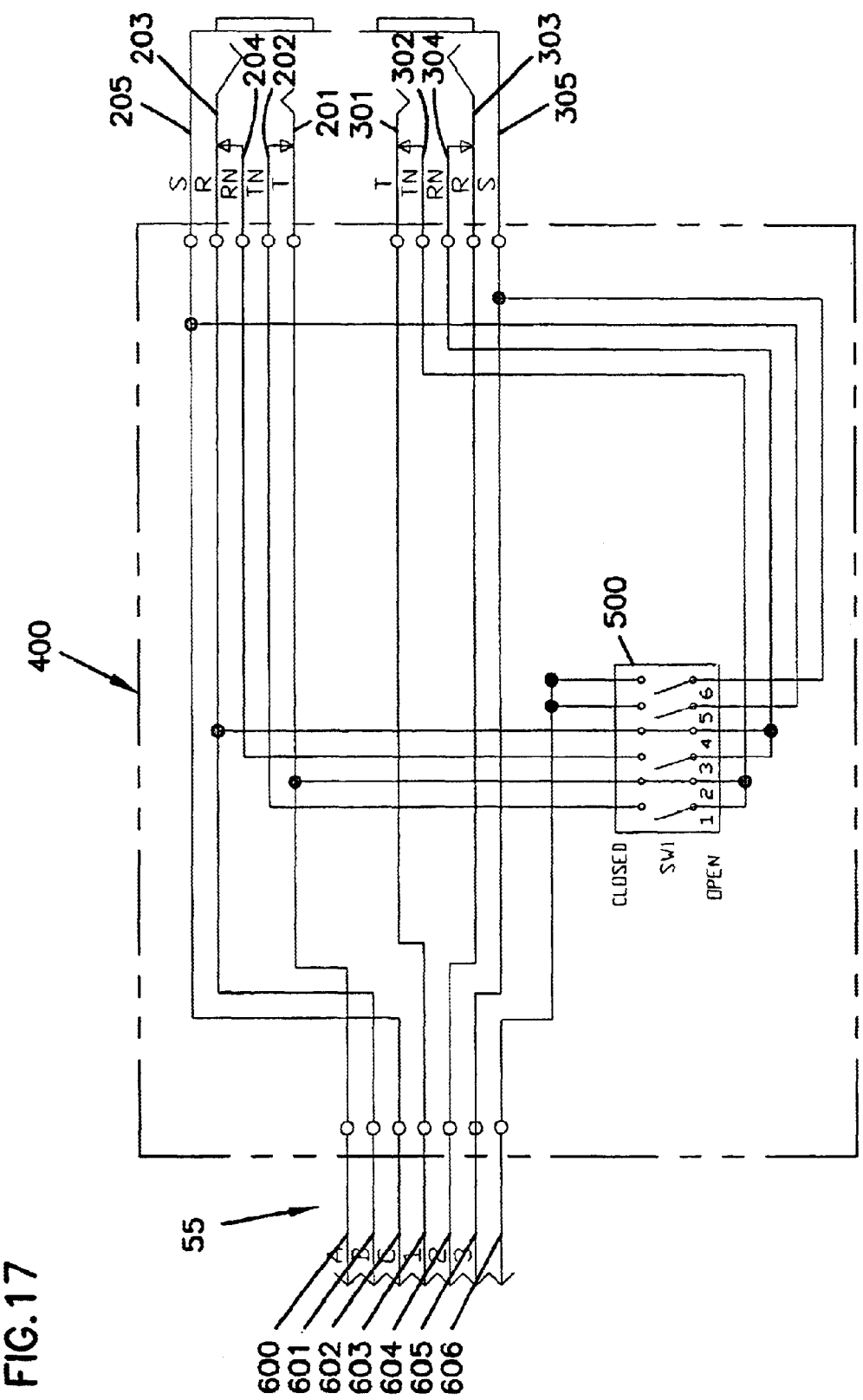
FIG. 17 is a schematic depiction of the jack of FIGS. 10 and 11 in a half-normal circuit configuration.

FIG. 17 shows the jack 28 in a half-normal circuit configuration. In this configuration, switches 2 and 4 of the switching device 500 have been closed. With switches 2 and 4 closed, the connector pins 600, 601 are electrically connected to the connector pins 603, 604 through the second spring assembly 300. In this configuration, signals traveling through the jack 28 can be monitored without interruption by inserting a patching plug into the upper patch port 35. By inserting a patch plug into the lower port 37, the connection between the pins 601, 602 and the pins 603,'604 is broken, and the patch plug is electrically connected to the pins 603, 604.

Figure 18:
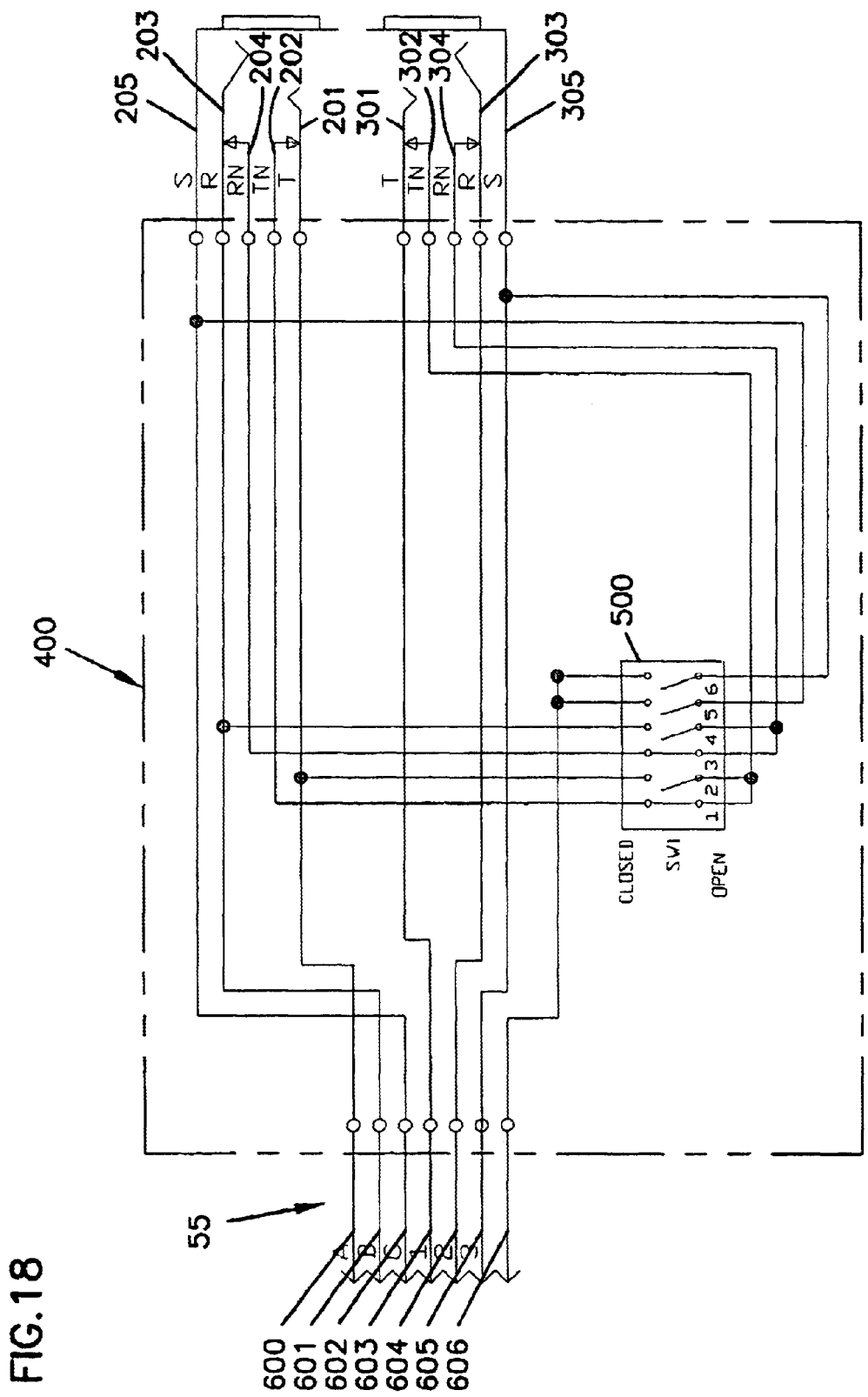
FIG. 18 is a schematic depiction of the jack of FIGS. 10 and 11 in a normal-strapped circuit configuration.

FIG. 18 shows the jack 28 in a normal-strapped circuit configuration in which switches 1 and 3 are closed. In this configuration, the connector pins 600, 601 are interconnected to the connector pins 603, 604 through both of the spring assemblies 200, 300. In the normal-strapped configuration, the connection between the pins 600, 601 and the pins 603, 604 can be broken by inserting a patch plug into either of the patch ports. When a patch plug is inserted into the upper patch port, the connection between the pins 600, 601 and 603, 604 is broken, and a patch plug connection is made with the pins 600, 601. When a patch plug is inserted into the lower patch plug port, the connection between the pins 600, 601 and the pins 603, 604 is broken, and a patch plug connection is made with the pins 603, 604.

Figure 19:
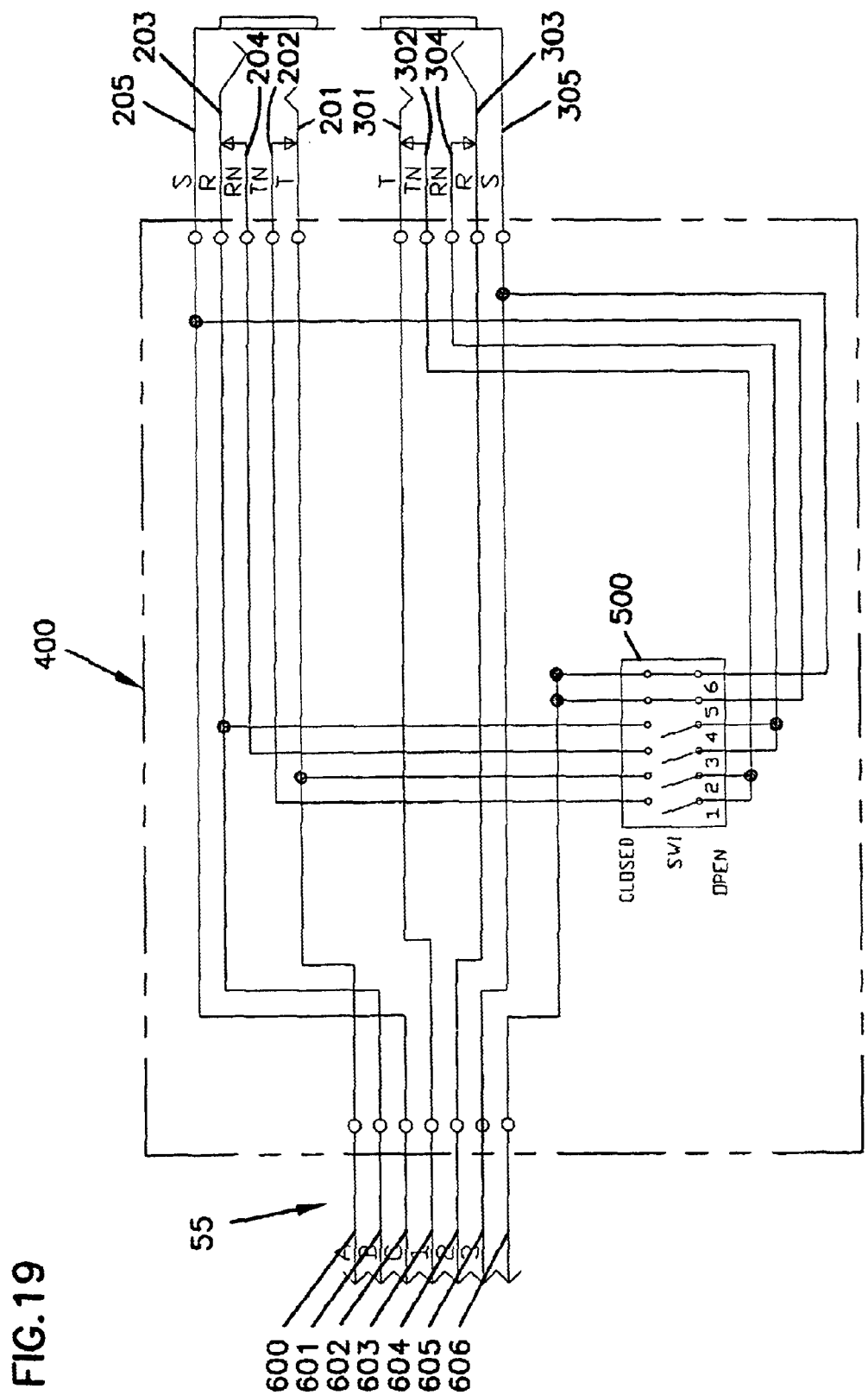
FIG. 19 is a schematic depiction of the jack of FIGS. 10 and 11 in a sleeve-normal configuration.

FIG. 19 shows the jack 28 in a sleeve-normal circuit configuration. In this configuration, switches 5 and 6 of the switching device 500 are closed. With switches 5 and 6 closed, the two sleeve ground springs 210, 310 are electrically connected to a sleeve bus pin 606 of the rear connector. This type of configuration allows multiple sleeve ground springs to be linked (i.e., daisy-chains) together to a common ground for convenience.

Since many embodiments of the invention can be made without departing from the spirit and scope of the invention, the invention resides in the claims hereinafter appended.

We claim:

1. A jack comprising:
   first and second spring assemblies, each spring assembly including a tip spring, a normal spring corresponding to the tip spring, a ring spring, and a normal spring corresponding to the ring spring;
   a switching device, the first and second spring assemblies being interconnected to one another through the switching device for changing a circuit configuration of the first and second spring assemblies between a normal-out configuration, a normal-strapped configuration, and a half-normal configuration; and
   the switching device being positioned directly behind the first and second spring assemblies.

2. The jack of claim 1, further comprising a rear connecter electrically connected to the first and second spring assemblies.

3. The jack of claim 2, wherein the switching device is positioned between the rear connector and the first and second spring assemblies.

4. The jack of claim 3, wherein the rear connector is electrically connected to the first and second spring assemblies by a circuit board, and wherein the switching device is mounted to the circuit board.

5. The jack of claim 4, further comprising a dielectric jack body to which the first and second spring assemblies are secured.

6. The jack of claim 4, wherein the jack body is a unitarily molded piece including a front panel defining patch plug ports, an intermediate portion to which the spring assemblies are secured, and a rear shroud for the rear connector.

7. The jack of claim 6, wherein the rear connector includes a single row of conductive pins housed within the shroud.

8. The jack of claim 6, wherein the unitarily molded piece includes top and bottom guides for guiding the jack into a chassis, and also defines a side window for allowing the switching device to be accessed.

9. The jack of claim 5, wherein the dielectric body defines a central axis that extends from a front to a rear of the jack body, wherein the central axis extends between the first and second switching assemblies, and wherein the switching device is aligned along the central axis.

10. The jack of claim 9, wherein the switching device includes a plurality of 2-position switches.

11. A jack comprising:
   a jack body including a front end and a rear end, the jack body including a front panel at the front end, the front panel defining a single pair of patch plug ports, the front panel also defining a width and height boundary that projects rearwardly from the front panel;
   first and second spring assemblies positioned behind the single pair of patch plug ports, each spring assembly including a tip spring, a normal spring corresponding to the tip spring, a ring spring, and a normal spring corresponding to the ring spring; and
   a switching device for changing a circuit configuration of the first and second spring assemblies between a normal-out configuration, a normal-strapped configuration, and a half-normal configuration, the switching device being located within the width and height boundary defined by the front panel of the jack body and positioned directly behind the first and second spring assemblies.

12. A jack comprising:
   a jack body including a front end and a rear end, the jack body including a front panel at the front end and a connector shroud at the rear end, the front panel defining only one pair of patch plug ports, the jack body also defining spring mounting structures, the front panel, the connector shroud and the spring mounting structures being integrally molded as a single unitary piece of dielectric material;

first and second spring assemblies positioned behind the patch plug ports, each spring assembly including a tip spring, a normal spring corresponding to the tip spring, a ring spring, and a normal spring corresponding to the ring spring, the spring assemblies being mounted at the spring mounting structures of the jack body; and a switching device for changing a circuit configuration of the first and second spring assemblies between a normal-out configuration, a normal-strapped configuration, and a half-normal configuration, the first and second spring assemblies being interconnected to one another through the switching device;

wherein the switching device is positioned between an uppermost spring of the first spring assembly and a lowermost spring of the second spring assembly.

13. A jack comprising:

first and second spring assemblies, each spring assembly including a tip spring, a normal spring corresponding to the tip spring, a ring spring, a normal spring corresponding to the ring spring, and a sleeve ground spring;

a switching device, the first and second spring assemblies being interconnected to one another through the switching device for changing a circuit configuration of the first and second spring assemblies in and out of a sleeve-normal configuration; and the switching device being positioned directly behind the first and second spring assemblies.

* * * * *